United States Patent
Seo et al.

(10) Patent No.: US 9,261,636 B2
(45) Date of Patent: Feb. 16, 2016

(54) POLARIZING PLATE, METHOD FOR PREPARING THE SAME, AND OPTICAL DISPLAY APPARATUS INCLUDING THE SAME

(71) Applicant: CHEIL INDUSTRIES INC., Gumi-si, Gyeongsangbuk-do (KR)

(72) Inventors: Eun Kyeong Seo, Uiwang-si (KR); Mun Bo Ko, Uiwang-si (KR); Min Jung Kim, Uiwang-si (KR); Yong Woon Kim, Uiwang-si (KR); Ki Ho Park, Uiwang-si (KR); Jung Kyu Lee, Uiwang-si (KR)

(73) Assignee: CHEIL INDUSTRIES INC., Gumi-si (KR)

( * ) Notice: Subject to any disclaimer, the term of this patent is extended or adjusted under 35 U.S.C. 154(b) by 54 days.

(21) Appl. No.: 14/106,382

(22) Filed: Dec. 13, 2013

(65) Prior Publication Data

US 2014/0168769 A1    Jun. 19, 2014

(30) Foreign Application Priority Data

Dec. 17, 2012 (KR) .................. 10-2012-0147860

(51) Int. Cl.
*G02B 27/28* (2006.01)
*G02B 5/30* (2006.01)

(52) U.S. Cl.
CPC ............. *G02B 5/3083* (2013.01); *Y10T 156/10* (2015.01)

(58) Field of Classification Search
CPC .................................. G02B 5/30; G02B 27/28
USPC ............. 359/483.01, 489.01, 489.07, 489.05, 359/489.06, 491.01; 362/19; 353/20; 349/56, 84, 87, 96–99, 104, 106
See application file for complete search history.

(56) References Cited

U.S. PATENT DOCUMENTS

| | | | |
|---|---|---|---|
| 2006/0028725 A1 | 2/2006 | Gerlach et al. | |
| 2008/0137187 A1* | 6/2008 | Nishida et al. | 359/485 |
| 2008/0143928 A1* | 6/2008 | Fukagawa | 349/96 |
| 2009/0135343 A1* | 5/2009 | Kitamura et al. | 359/499 |
| 2009/0251644 A1* | 10/2009 | Park et al. | 359/500 |
| 2012/0007106 A1* | 1/2012 | Jung et al. | 257/88 |
| 2013/0141787 A1* | 6/2013 | Kim et al. | 359/487.02 |

FOREIGN PATENT DOCUMENTS

KR    10-2007-0048231 A    5/2007

OTHER PUBLICATIONS

KIPO Office action dated Dec. 29, 2014, for priority KR application No. 10-2012-0147860, 4 pages.

* cited by examiner

*Primary Examiner* — Scott J Sugarman
*Assistant Examiner* — Alberto Betancourt
(74) *Attorney, Agent, or Firm* — Christie, Parker & Hale, LLP

(57) ABSTRACT

A polarizing plate includes a polarizer having absorption and transmission axes, a protective film on an upper surface of the polarizer, a half-wavelength ($\lambda/2$) retardation film on a lower surface of the polarizer, an adhesive layer on a lower surface of the half-wavelength ($\lambda/2$) retardation film, and a quarter-wavelength ($\lambda/4$) retardation film on a lower surface of the adhesive layer. An absolute orthogonal b-coordinate value based on a CIELAB color coordinate system of the polarizing plate may be approximately 3 or less when the polarizing plate is stacked with a reference polarizing plate having a degree of polarization of at least 99.9% such that an angle between the absorption axis of the polarizer and an absorption axis of a polarizer of the reference polarizing plate or an angle between the transmission axis of the polarizer and a transmission axis of the polarizer of the reference polarizing plate is 90°.

19 Claims, 2 Drawing Sheets

POLARIZING PLATE, METHOD FOR PREPARING THE SAME, AND OPTICAL DISPLAY APPARATUS INCLUDING THE SAME

CROSS-REFERENCE TO RELATED APPLICATION

This application claims priority to and the benefit of Korean Patent Application No. 10-2012-0147860, filed on Dec. 17, 2012, in the Korean Intellectual Property Office, the entire disclosure of which is incorporated herein by reference.

BACKGROUND

1. Field

Aspects of the present invention relate to a polarizing plate, a method for preparing the same, and an optical display apparatus including the same.

2. Description of the Related Art

An organic light emitting diode (OLED) display refers to an emissive display apparatus that emits light through electrical excitation of fluorescent organic compounds. Such a display apparatus has advantages including operability at a lower voltage, reduced thickness, etc. In addition, OLED display apparatuses overcome many of the problems associated with typical liquid crystal display apparatuses involving viewing angle, response times, etc., and have, thus, attracted much attention in recent years.

Generally, an OLED display apparatus includes a glass substrate, an organic electroluminescent section on the glass substrate, and a protective cap having water-absorption properties surrounding the organic electroluminescent section.

Unlike liquid crystal displays, OLED displays do not require a polarizing plate. However, in order to compensate for deterioration in brightness due to reflection of external light by an aluminum plate of an OLED driving panel, an OLED display generally does employ a polarizing plate. The polarizing plate is generally positioned on one surface of the glass substrate.

Typically, a polarizing plate includes a quarter-wavelength ($\lambda/4$) retardation film. However, a polarizing plate capable of enabling circular polarization using a single $\lambda/4$ retardation film often encounters problems including low lateral reflective visibility and insufficient prevention of reflection of external light.

Japanese Patent Publication No. 2003-090912A discloses a retardation plate that includes a first layer formed of a resin having a positive inherent birefringence value and a second layer formed of a resin having a negative inherent birefringence value.

SUMMARY

Embodiments of the present invention relate to a polarizing plate, a method for preparing a polarizing plate, and an optical display apparatus including a polarizing plate.

According to an embodiment of the present invention, a polarizing plate may include a polarizer having an absorption axis, a protective film on an upper surface of the polarizer, a half-wavelength ($\lambda/2$) retardation film on a lower surface of the polarizer, an adhesive layer on a lower surface of the half-wavelength ($\lambda/2$) retardation film, and a quarter-wavelength ($\lambda/4$) retardation film on a lower surface of the adhesive layer. An absolute orthogonal b-coordinate value based on a CIELAB color coordinate system of the polarizing plate may be approximately 3 or less when the polarizing plate is stacked with a reference polarizing plate having a degree of polarization of at least 99.9% such that an angle between the absorption axis of the polarizer and an absorption axis of a polarizer of the reference polarizing plate is 90°.

In one embodiment, the polarizer of the polarizing plate may further include a transmission axis, and the absolute orthogonal b-coordinate value based on the CIELAB color coordinate system may be approximately 3 or less when the polarizing plate is stacked with the reference polarizing plate having a degree of polarization of at least 99.9% such that an angle between the transmission axis of the polarizer and a transmission axis of the polarizer of the reference polarizing plate is 90°.

In one embodiment, the absolute orthogonal b-coordinate value of the polarizing plate may range from approximately 1.9 to approximately 2.6.

In one embodiment, the polarizing plate may have a moisture content ranging from approximately 2.0 wt % to approximately 2.8 wt %, and the polarizer may have a boric acid content ranging from approximately 20.5 wt % to approximately 22.5 wt %.

In one embodiment, the polarizer may have a thickness ranging from approximately 5 micrometers to approximately 25 micrometers.

In one embodiment, the protective film of the polarizing plate may include a resin such as cellulose, polyester, cyclic polyolefin, polycarbonate, polyether sulfone, polysulfone, polyamide, polyimide, polyolefin, polyarylate, polyvinyl alcohol, polyvinyl chloride, and/or polyvinylidene chloride.

In one embodiment, at a wavelength of 550 nanometers, the half-wavelength ($\lambda/2$) retardation film of the polarizing plate may have an in-plane retardation value ranging from approximately 200 nanometers to approximately 300 nanometers, and the quarter-wavelength ($\lambda/4$) retardation film may have an in-plane retardation value ranging from approximately 100 nanometers to approximately 200 nanometers.

In one embodiment, at a wavelength of 550 nanometers, the half-wavelength ($\lambda/2$) retardation film of the polarizing plate may have an out-of-plane retardation value ranging from approximately 220 nanometers to approximately 240 nanometers, and the quarter-wavelength ($\lambda/4$) retardation film may have an out-of-plane retardation value ranging from approximately −100 nanometers to approximately −130 nanometers. The out-of-plane retardation value (Rth) may be calculated using the formula $Rth=((nx+ny)/2-nz) \times d$, where nx, ny, and nz are refractive indexes in x-, y-, and z-axis directions of each retardation film, and d is a thickness of the retardation film.

In one embodiment, the half-wavelength ($\lambda/2$) retardation film of the polarizing plate may include a cycloolefin film, and the quarter-wavelength ($\lambda/4$) retardation film may include an acrylic film.

In one embodiment, the half-wavelength ($\lambda/2$) retardation film and the quarter-wavelength ($\lambda/4$) retardation film of the polarizing plate may have birefringences of opposite signs.

In one embodiment, the polarizing plate may further include a protective film between the polarizer and the half-wavelength ($\lambda/2$) retardation film, or between the half-wavelength ($\lambda/2$) retardation film and the quarter-wavelength ($\lambda/4$) retardation film.

In accordance with another embodiment of the present invention, a method for preparing a polarizing plate may include preparing a polarizer having approximately 25 wt % to approximately 26 wt % moisture and approximately 20.5 wt % to approximately 22.5 wt % boric acid; and forming a protective film and/or a retardation film on at least one surface of the polarizer.

In one embodiment, preparing the polarizer may include stretching a polyvinyl alcohol film in an aqueous boric acid solution having approximately 3.0 wt % to approximately 3.5 wt % boric acid, and drying the stretched polyvinyl alcohol film at a drying temperature of approximately 50° C. to approximately 70° C., and at an air volume having an air supply rate of approximately 1400 RPM to approximately 1500 RPM, and an air exhaust rate of approximately 2000 RPM to approximately 3000 RPM.

In one embodiment, forming the protective film and/or the retardation film may include placing a protective film on an upper surface of the polarizer, and placing a half-wavelength (λ/2) retardation film on a lower surface of the polarizer, and a quarter-wavelength (λ/4) retardation film on a lower surface of the half-wavelength (λ/2) retardation film.

In accordance with another embodiment of the present invention, an optical display apparatus may include a panel, and a polarizing plate stacked on an upper surface of the panel. The polarizing plate may include a polarizer having an absorption axis, a half-wavelength (λ/2) retardation film on a lower surface of the polarizer, and a quarter-wavelength (λ/4) retardation film on a lower surface of the half-wavelength (λ/2) retardation film. The absolute orthogonal b-coordinate value based on a CIELAB color coordinate system of the polarizing plate may be approximately 3 or less when the polarizing plate is stacked with a reference polarizing plate having a degree of polarization of at least 99.9% such that an angle between the absorption axis of the polarizer and an absorption axis of a polarizer of the reference polarizing plate is 90°.

In one embodiment, the polarizer of the polarizing plate may further include a transmission axis, and the absolute orthogonal b-coordinate value based on the CIELAB color coordinate system may be approximately 3 or less when the polarizing plate is stacked with the reference polarizing plate having a degree of polarization of at least 99.9% such that an angle between the transmission axis of the polarizer and a transmission axis of the polarizer of the reference polarizing plate is 90°.

In one embodiment, the apparatus may be an organic light emitting diode (OLED) display apparatus.

In one embodiment, the polarizing plate may further include a protective film on an upper surface of the polarizer and an adhesive layer on a lower surface of the half-wavelength (λ/2) retardation film.

In another embodiment, the polarizing plate may further include a second adhesive layer on a lower surface of the a quarter-wavelength (λ/4) retardation film.

In another embodiment, the polarizing plate may have a moisture content ranging from approximately 2.0 wt % to approximately 2.8 wt %; the polarizer may have a boric acid content ranging from approximately 20.5 wt % to approximately 22.5 wt %. The half-wavelength (λ/2) retardation film may have an in-plane retardation value ranging from approximately 200 nanometers to approximately 300 nanometers, and the quarter-wavelength (λ/4) retardation film may have an in-plane retardation value ranging from approximately 100 nanometers to approximately 200 nanometers at a wavelength of 550 nanometers. The half-wavelength (λ/2) retardation film may have an out-of-plane retardation value ranging from approximately 220 nanometers to approximately 240 nanometers, and the quarter-wavelength (λ/4) retardation film may have an out-of-plane retardation value ranging from approximately −100 nanometers to approximately −130 nanometers at a wavelength of 550 nanometers, where the out-of-plane retardation value (Rth) is calculated using the formula Rth=((nx+ny)/2−nz)×d, and where nx, ny, and nz are refractive indexes in x-, y-, and z-axis directions of each retardation film, and d is a thickness of the retardation film.

BRIEF DESCRIPTION OF THE DRAWINGS

The above and other aspects, features, and advantages of the invention will become apparent from the detailed description of the following embodiments given in conjunction with the accompanying drawings, in which.

DETAILED DESCRIPTION

Figure 1:
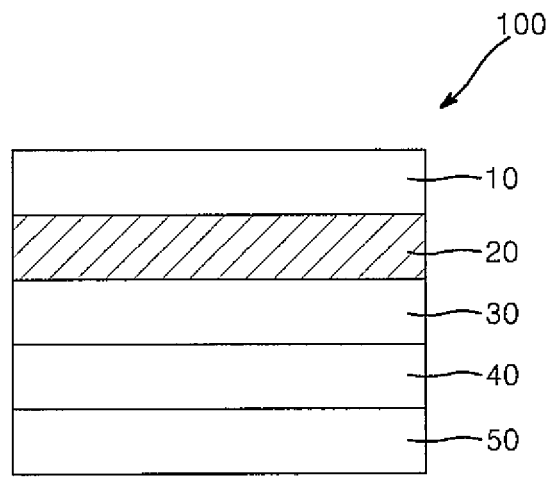
FIG. 1 is a cross-sectional view of a polarizing plate in accordance with one embodiment of the present invention.

Exemplary embodiments of the present invention will be described in detail with reference to the accompanying drawings. It should be understood that aspects of the present invention may be embodied in different ways and are not limited to the following embodiments. In the drawings, portions not relevant to the description will be omitted for clarity. Like components will be denoted by like reference numerals throughout the specification. As used herein, terms such as "upper side" or "upper surface" and "lower side" or "lower surface" are defined with reference to the accompanying drawings. Thus, it will be understood that the term "upper side" or "upper surface" can be used interchangeably with the term "lower side" or "lower surface."

As used herein, terms such as "upper side" or "upper surface" and "lower side" or "lower surface" are defined with reference to a certain layer (for example: polarizer, half-wavelength (λ/2) retardation film, quarter-wavelength (λ/4) retardation film, etc.) shown in the accompanying drawings. Thus, it will be understood that the term "upper side" or "upper surface" can be used interchangeably with the term "lower side" or "lower surface."

Figure 2:
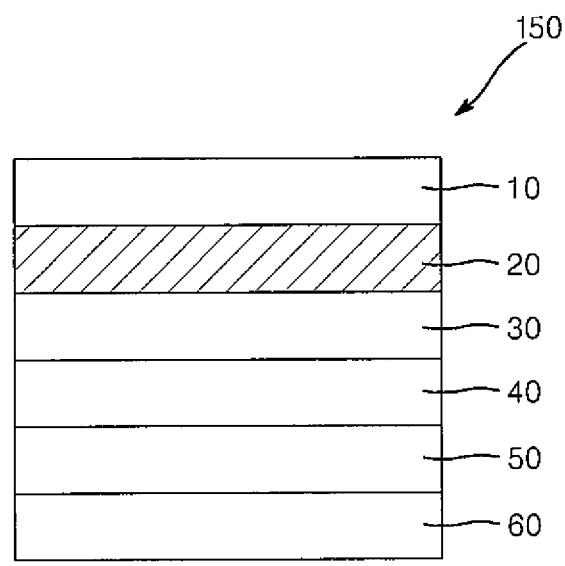
FIG. 2 is a cross-sectional view of a polarizing plate in accordance with another embodiment of the present invention.

In accordance with an embodiment of the present invention, a polarizing plate 100 or 150 (as shown in FIGS. 1 and 2, for example) may include a polarizer 20 having an absolute orthogonal b-coordinate value based on the CIELAB color coordinate system. In this embodiment, the absolute orthogonal b-coordinate value of the polarizer 20 may be approximately 3 or less when the polarizing plate 100 or 150 and a reference polarizing plate with a degree of polarization of 99.9% or greater are stacked such that an angle defined between an absorption axis of the polarizer 20 and an absorption axis of a polarizer of the reference polarizing plate is 90°, or an angle defined between a transmission axis of the polarizer 20 and a transmission axis of the polarizer of the reference polarizing plate is 90°. In one embodiment, the orthogonal b-coordinate value is measured using a V-7170 device (manufactured by JASCO of Japan, for example), and the CIELAB color coordinate system is set to a 1976 color space.

The reference polarizing plate may be a polarizing plate having an orthogonal b-coordinate value measured by the V-7170 (manufactured by JASCO of Japan) with reference to the CIELAB color coordinate system. The reference polarizing plate may have a degree of polarization of about 99.9% or greater, for example, ranging from approximately 99.9% to approximately 100%, as obtained using the V-7170 (manufactured by JASCO of Japan).

Figure 3:
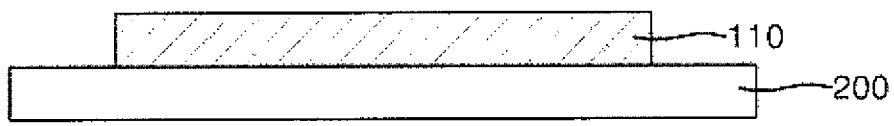
FIG. 3 is a cross-sectional view of an optical display apparatus in accordance with an embodiment of the present invention.

If the absolute orthogonal b-coordinate value of the polarizer 20 exceeds 3, the polarizing plate 100, 150 may provide undesirable visibility due to reflective brightness and lateral color variation when stacked on a panel 200 (as shown in FIG. 3) for an optical display apparatus (for example, an organic light emitting display). The absolute orthogonal b-coordinate value may range, for example, from approximately 0 to approximately 3, or from approximately 1.9 to approximately 2.6. Within this range, the polarizing plate 100, 150 according to embodiments of the present invention may prevent reflection of external light, compensate for lateral color variation, and prevent deterioration in front visibility and lateral brightness, when stacked on the panel 200 for the optical display apparatus.

In an embodiment, the orthogonal b-coordinate value may range from approximately −3 to approximately +3, or for example, from approximately −2.6 to approximately −1.9. Within these ranges, the polarizing plate 100, 150 according to an embodiment of the present invention may compensate for lateral color variation and may prevent deterioration in front visibility and lateral brightness, when stacked on a panel 200 for an optical display apparatus (for example, an organic light emitting display).

In the polarizing plate 100 or 150 according to an embodiment of the present invention, the polarizer 20 may contain approximately 20.5 wt % to approximately 22.5 wt % boric acid, and in an embodiment, approximately 21 wt % to approximately 22 wt % boric acid, for example 21.1, 21.2, 21.3, 21.4, 21.5, 21.6, 21.7, 21.8, 21.9, or 22 wt %; and the polarizing plate 100 or 150 may contain approximately 2 wt % to approximately 3 wt % moisture, and in an embodiment, approximately 2 wt % to approximately 2.8 wt % moisture, for example 2.0, 2.1, 2.2, 2.3, 2.4, 2.5, 2.6, 2.7, or 2.8 wt %. Within this range, the polarizing plate 100 or 150 according to these embodiments may prevent deterioration in durability of the polarizer 20 while exhibiting good lateral visibility. The content of boric acid and moisture may be measured from the polarizing plate 100 or 150 which is fabricated by laminating a protective film 10 or retardation film 30 on the polarizer 20 (as shown in FIGS. 1 and 2) and then curing the laminated polarizer 20 at 25° C. for 24 hours, or from an already fully-assembled polarizing plate 100 or 150, without being limited thereto.

In an embodiment, the absolute orthogonal b-coordinate value may be reached by controlling the content of moisture and the content of boric acid in the polarizer 20 before lamination.

In one embodiment, before laminating the protective film 10 or the retardation film 30 on the polarizer 20, the boric acid content of the polarizer 20 may range from approximately 20.5 wt % to approximately 22.5 wt %, for example from approximately 21 wt % to approximately 22 wt %, for example 21.1, 21.2, 21.3, 21.4, 21.5, 21.6, 21.7, 21.8, 21.9, or 22 wt %. In embodiments where the boric acid content of the polarizer 20 is less than 20.5 wt % before lamination of the protective film 10 or the retardation film 30 on the polarizer 20, the absolute orthogonal b-coordinate value can exceed 3, and, thus, the resulting polarizing plate 100 or 150 can have an undesirable degree of polarization. In embodiments where the boric acid content of the polarizer 20 exceeds 22.5 wt % before lamination of the protective film 10 or the retardation film 30 on the polarizer 20, the absolute orthogonal b-coordinate value can exceed 3, and, thus, the resulting polarizer 20 may be likely to break. In embodiments of the present invention, there should be no significant difference in the content of boric acid between the time before lamination and the time after lamination and curing.

In another embodiment, before laminating the protective film 10 or the retardation film 30 on the polarizer 20, the moisture content of the polarizer 20 may range from approximately 25 wt % to approximately 26 wt % for example, from approximately 25 wt % to approximately 25.5 wt %, for example approximately 25.0, 25.1, 25.2, 25.3, 25.4, or 25.5 wt %. In embodiments where the moisture content of the polarizer 20 is less than 25 wt % before laminating the protective film 10 or the retardation film 30 on the polarizer 20, the absolute orthogonal b-coordinate value can exceed 3, making it difficult to form the polarizer 20; and in embodiments where the moisture content exceeds 26 wt % before laminating the protective film 10 or the retardation film 30 on the polarizer 20, the absolute orthogonal b-coordinate value can exceed 3, resulting in a 20 having low durability.

The polarizing plate 100 or 150 may include a polarizer 20, and a protective film 10 or a retardation film 30, positioned on at least one side of the polarizer 20.

The polarizer 20 may have a thickness ranging from approximately 5 micrometers (μm) to approximately 100 μm, and in some embodiments, ranging from approximately 5 μm to approximately 50 μm, or from approximately 5 μm to approximately 25 μm. A polarizer 20 within this thickness range, according to embodiments of the present invention, can be applied to an optical display apparatus.

The protective film 10 may be placed on the polarizer 20 via an adhesive layer 40, which may be made from a material selected from the group consisting of water-based adhesives, pressure-sensitive adhesives, and UV-curable adhesives.

The protective film 10 may have a thickness ranging from approximately 20 μm to approximately 100 μm, and in one embedment, ranging from approximately 40 μm to approximately 80 μm. Within this thickness range, the protective film 10 may be applied to the polarizing plate 100 or 150 by being stacked on the polarizer 20, according to an embodiment of the present invention.

The protective film 10 may be any transparent resin film. For example, the protective film 10 may be a film composed of at least one resin selected from among the group consisting of celluloses, polyesters, cyclic polyolefins, polycarbonates, polyethersulfones (PES), polysulfones (PSU), polyamides, polyimides, polyolefins, polyarylates, polyvinyl alcohols, polyvinyl chlorides, and polyvinylidene chlorides (PVDC).

The retardation film 30 or 50 may include at least one of a λ/2 retardation film 30 and a λ/4 retardation film 50, and may be positioned on the polarizer 20 via an adhesive layer 40. The adhesive layer may be composed of at least one adhesive selected from the group consisting of water-based adhesives, pressure-sensitive adhesives, and UV-curable adhesives. Advantageously, the retardation film 30 or 50 may include a stack of the λ/2 retardation film 30 and the λ/4 retardation film 50 to improve anti-reflectivity.

The λ/2 retardation film 30 and the λ/4 retardation film 50 may include birefringences having different or opposite signs, thereby resulting in a reduction in a phase retardation difference according to lateral angles. For example, when the λ/2 retardation film 30 has a positive birefringence, the λ/4 retardation film 50 has a negative birefringence. In another embodiment, when the λ/2 retardation film 30 has a negative birefringence, the λ/4 retardation film 50 has a positive birefringence. The term "positive birefringence" means that when light is incident upon a uniaxially aligned film, a refractive index of the light in the alignment direction is greater than that in an orthogonal direction thereto, and the term "negative birefringence" means that when light is incident upon the uniaxially aligned film, a refractive index of the light in the alignment direction is less than that in the orthogonal direction thereto. For example, the λ/2 retardation film 30 may have an average birefringence ranging from approximately 1.3 to approximately 1.4, and the λ/4 retardation film 50 may have an average birefringence ranging from approximately 1.4 to approximately 1.5. In this embodiment, an inherent birefringence of the λ/2 retardation film 30 is positive (+), and an inherent birefringence of the λ/4 retardation film 50 is negative (−).

The λ/2 retardation film 30 may have an in-plane retardation (Re) at a wavelength of 550 nanometers (nm) ranging from approximately 200 nm to approximately 300 nm, and in one embodiment, ranging from approximately 250 nm to approximately 280 nm; and the λ/4 retardation film 50 may have an in-plane retardation (Re) at a wavelength of 550 nm ranging from approximately 100 nm to approximately 200 nm, and in one embodiment, ranging from approximately 130 nm to approximately 150 nm.

In embodiments of the present invention, the λ/2 retardation film 30 and the λ/4 retardation film 50, the in-plane retardation (Re) at a wavelength of 550 nm, an out-of-plane retardation (Rth) at a wavelength of 550 nm, and a refractive index (Nz) at a wavelength of 550 nm for the degree of biaxiality may be calculated using Equations 1 through 3:

$$Re = (nx - ny) \times d \qquad \text{Equation 1:}$$

$$Rth = ((nx + ny)/2 - nz) \times d \qquad \text{Equation 2:}$$

$$Nz = (nx - nz)/(nx - ny), \qquad \text{Equation 3:}$$

wherein nx, ny and nz are refractive indexes in the x-, y-, and z-axis directions, respectively, of the retardation film 30 or 50, and d is a thickness of the retardation film 30 or 50 in nanometers (nm).

The retardation film 30 or 50 may have a length corresponding to an x-axis direction, a width corresponding to a y-axis direction, and a thickness corresponding to a z-axis direction.

In one embodiment, at a wavelength of 550 nm, the λ/2 retardation film 30 may have an in-plane retardation Re ranging from approximately 250 nm to approximately 280 nm, an out-of-plane retardation Rth ranging from approximately 220 nm to approximately 240 nm, and a refractive index Nz ranging from approximately 1.52 to approximately 1.54. In this embodiment, at a wavelength of 550 nm, the λ/4 retardation film 50 may have an in-plane retardation Re ranging from approximately 130 nm to approximately 150 nm, an out-of-plane retardation Rth ranging from approximately −100 nm to approximately −130 nm, and a refractive index Nz ranging from approximately 1.48 to approximately 1.50. Within this range, the polarizing plate 100 or 150 according to embodiments of the present invention may exhibit improved reflective visibility and may achieve complete anti-reflectivity of external light.

Each of the λ/2 retardation film 30 and the λ/4 retardation film 50 may be made of a transparent film having a phase retardation function, and may include a film made of at least one resin selected from among olefin resins including cycloolefin polymer (COP) resins, acrylic resins, cellulose resins, etc. In an embodiment, the λ/2 retardation film 30 may be a cycloolefin film, and the λ/4 retardation film 50 may be an acrylic film.

The retardation film 30 or 50 may have a thickness ranging from approximately 10 μm to approximately 100 μm, and in an embodiment, ranging from approximately 10 μm to approximately 60 μm. Within this thickness range, the retardation film 30 or 50 according to an embodiment of the present invention can provide optical compensation and circular polarization effects when used in the polarizing plate 100 or 150. In one embodiment, the λ/2 retardation film 30 has a thickness ranging from approximately 40 μm to approximately 50 μm, and the λ/4 retardation film 50 has a thickness ranging from approximately 40 μm to approximately 50 μm.

In embodiments where the polarizing plate 100 or 150 utilizes circular polarization using the λ/4 retardation film 50 alone, the polarizing plate 100 or 150 may have reduced lateral reflective visibility, thereby providing insufficient anti-reflective properties. To overcome these types of problems, the λ/2 retardation film 30 and the λ/4 retardation film 50 in embodiments of the present invention may be combined at a certain angle. In some embodiments, the λ/2 retardation film 30 and the λ/4 retardation film 50 may be stacked such that an angle of an optical axis $\theta_{\lambda/4}$ of the λ/4 retardation film 50 can be calculated using the formula $\theta_{\lambda/4} = 2 \times \theta_{\lambda/2} + 45°$, where $\theta_{\lambda/2}$ is an optical axis of the λ/2 retardation film 30. In one embodiment, $\lambda_{\lambda/4}$ may range from approximately 75° to approximately 90°, and $\theta_{\lambda/2}$ may range from approximately 15° to approximately 22.5°, a reference point from which the $\theta_{\lambda/4}$ and $\theta_{\lambda/2}$ angles are measured may be an absorption axis or a transmission axis of the polarizer 20. Within this range, it is possible to provide good lateral refection visibility and to achieve complete lateral anti-reflectivity in embodiments of the present invention.

The protective film 10 may also be positioned between the polarizer 20 and the λ/2 retardation film 30, or between the λ/2 retardation film 30 and the λ/4 retardation film 50, in order to improve mechanical strength of the polarizing plate 100 or 150, for example.

FIG. 1 is a cross-sectional view of a polarizing plate in accordance with one embodiment of the invention. Referring to FIG. 1, a polarizing plate 100 may include a polarizer 20, a protective film 10 on an upper side of the polarizer 20, a λ/2 retardation film 30 on a lower side of the polarizer 20, a first adhesive layer 40 on a lower side of the λ/2 retardation film 30, and a λ/4 retardation film 50 on a lower side of the first adhesive layer 40.

FIG. 2 is a cross-sectional view of a polarizing plate in accordance with another embodiment of the invention. Referring to FIG. 2, the polarizing plate 150 may include a polarizer 20, a protective film 10 on an upper side of the polarizer 20, a λ/2 retardation film 30 on a lower side of the polarizer 20, a first adhesive layer 40 on a lower side of the λ/2 retardation film 30, a λ/4 retardation film 50 on a lower side of the first adhesive layer 40, and a second adhesive layer 60 on a lower side of the λ/4 retardation film 50. The polarizing plate 150 may be positioned on a panel 200 of an optical display apparatus such as OLED (as shown in FIG. 3) via the second adhesive layer 60.

The first adhesive layer 40 and the second adhesive layer 60 may be formed of adhesives having transparency, durability, or reworkability. The adhesives may include adhesive compositions including a (meth)acrylic copolymer as an adhesive resin.

The polarizing plate 150 may have a thickness ranging from approximately 120 μm to approximately 170 μm. Within this thickness range, the polarizing plate 150 according to embodiments of the present invention may be applied to an organic light emitting display apparatus.

The polarizing plate 150 may have a reflective brightness of approximately 18% or less, for example, ranging from approximately 17% to approximately 18%, and a color shift of approximately 9% or less, for example, ranging from approximately 8% to approximately 9%.

The polarizing plate 150 may be fabricated by laminating the protective film 10 or the retardation film 30 on at least one side of the polarizer 20 via a bonding agent or adhesives, the polarizer 20 according to this embodiment containing approximately 25 wt % to approximately 26 wt % moisture and approximately 20.5 wt % to approximately 22.5 wt % boric acid, without being limited thereto. A curing process after lamination may further enhance adhesion between the polarizer 20 and the protective film 10 or the retardation film 30, in embodiments of the present invention.

A further embodiment of the invention provides a method for fabricating a polarizing plate 100, 150, or 110. The method may include preparing a polarizer 20 containing approximately 25 wt % to approximately 26 wt % moisture, and approximately 20.5 wt % to approximately 22.5 wt % boric acid; and stacking a protective film 10 or a retardation film 30 on at least one side of the polarizer 20.

According to an embodiment, the polarizer 20 may be prepared by dyeing a material known in the art for polarizers, followed by stretching the dyed material, according to methods and processes known in the art.

According to embodiments of the present invention, the polarizers 20 can be made from any commercially available material known in the art, for example, a polyvinyl alcohol film prepared by solvent casting or melt extrusion, etc. Solvent casting refers to a process of preparing a film by dissolving a resin in a solvent to prepare a resin solution, coating the resin solution on a casting roll or belt, and then evaporating the solvent therefrom. Melt extrusion refers to a process of preparing a film by melting a resin at a melting point or higher, and then extruding it onto a cooling roll and cooling.

The polyvinyl alcohol film material of the polarizer 20 according to an embodiment may be subjected to water washing and swelling. Water washing is performed to remove foreign materials from the polyvinyl alcohol film, and swelling is performed to allow efficient dyeing of the polyvinyl alcohol film. Specifically, the polyvinyl alcohol film maybe passed through a swelling bath which contains water or chloride, boric acid, an inorganic acid, an organic solvent, etc. In these embodiments, the swelling bath may be maintained at a temperature ranging from approximately 20° C. to approximately 30° C. Fabrication and selection of the swelling bath may be easily carried out by those skilled out in the art.

The polyvinyl alcohol film material of the polarizer 20 according to an embodiment may be dyed with a dichroic material to exhibit polarization properties. The dichroic material may include iodine, dichroic dyes, etc. When dyeing with iodine molecules, an iodine dyeing bath may further contain potassium iodide and boric acid. Dyeing with iodine may be performed at a temperature ranging from approximately 20° C. to approximately 55° C. In the iodine dyeing bath, the concentration of iodine may range from approximately 1.5 wt % to approximately 2.5 wt %, the concentration of potassium iodide may range from approximately 0.3 wt % to approximately 0.5 wt %, and the concentration of boric acid may range from approximately 0.5 wt % to approximately 0.7 wt %.

After dyeing, the polyvinyl alcohol film material of the polarizer 20 according to an embodiment may be further subjected to a cross-linking process. The cross-linking process may be performed to achieve strong attachment of iodine molecules to a polyvinyl alcohol polymer matrix. In these embodiments, a cross-linking agent may include boric acid, and may further include phosphate compounds.

The polyvinyl alcohol film material of the polarizer 20 according to an embodiment may be subjected to a stretching process. The stretching process may be dry stretching or wet stretching. Dry stretching may be performed by an inter-roll stretching method, a compression stretching method, a heated roll stretching method, etc. A stretching bath for wet stretching may contain boric acid. During a stretching process, the aforementioned content of boric acid in the polarizer 20 may be reached by controlling the concentration of the boric acid solution, and the temperature of the stretching bath. The temperature of the stretching bath may range from approximately 35° C. to approximately 65° C., and the concentration of the boric acid may range from approximately 3.0 wt % to approximately 3.5 wt %. By the overall stretching process, the polyvinyl alcohol film according to these embodiments may be stretched to a length of approximately 3 to approximately 7 times an initial length of the polyvinyl alcohol film.

Stretching may be performed simultaneously with dyeing, or may be performed after dyeing, or vice versa, according to embodiments of the present invention. In addition, stretching and dyeing may be performed simultaneously with the cross-linking process. When performed simultaneously with dyeing, stretching and dyeing may be performed in a solution containing iodine, and when performed simultaneously with cross-linking, these processes may be performed in a solution containing boric acid.

The content of boric acid in the polarizer 20 may depend on stretching speed. Regardless of how high the concentration of boric acid may be in the stretching bath, the boric acid can escape from the stretching bath when the film is stretched at a predetermined speed or less. Thus, in embodiments where the stretching speed is maintained at approximately 13 miles per minute (mpm) or greater, and preferably from approximately 15 mpm to 17 mpm with a boric acid concentration in the stretching bath at approximately 3.0 wt % or greater, and preferably ranging from approximately 3.0 wt % to approximately 3.5 wt %, it is possible to achieve a desired boric acid amount in the polarizer 20 having approximately 20 wt % or more boric acid, and preferably ranging from approximately 20.5 wt % to approximately 22.5 wt % boric acid.

After the stretching process, the polyvinyl alcohol film material of the polarizer 20 according to these embodiments may be subjected to color correction. Color correction may be performed in a color correction bath containing potassium iodide and/or boric acid, without being limited thereto. For the color correction, the color correction bath may contain approximately 1 wt % to approximately 10 wt % potassium iodide and approximately 0.1 wt % to approximately 3 wt % boric acid.

Next, the prepared polarizer 20 according to these embodiments is dried while passing through a drying zone. The moisture content of the polarizer 20 may be controlled by adjusting a drying temperature, residence pass of the polarizer 20, and an air volume in a drying zone upon drying. Specifically, the drying temperature may be adjusted in the range of approximately 50° C. to approximately 70° C., and the air volume in the drying zone may be adjusted to have an air supply rate ranging from approximately 1400 RPM to approximately 1500 RPM with an air exhaust rate ranging from approximately 2000 RPM to approximately 3000 RPM, such that the polarizer 20 contains approximately 25 wt % to approximately 26 wt % moisture before lamination.

According to embodiments of the present invention, the polarizing plate 150 may be fabricated by bonding a protective film 10 and a retardation film 30 to the polarizer 20 via adhesives or a bonding agent. Details of the protective film 10 and retardation film 30 are described above, and the protective film 10 and the retardation film 30 may be formed on one side of the polarizer 20 via at least one of a water-based adhesive, pressure-sensitive adhesive, or a UV-curable adhesive. In one embodiment, the protective film 10 may be positioned on an upper side of the polarizer 20, and the retardation film 30 may be positioned on a lower side of the polarizer 20.

The polarizer 20 may be adhered with two sheets of retardation film 30 and 50. In one embodiment, a λ/2 retardation film 30 may be positioned on the lower side of the polarizer 20, a λ/4 retardation film 50 may be positioned on a lower side of the λ/2 retardation film 30, and an adhesive layer 40, for example, an adhesive layer 40 including a (meth)acrylic adhesive, may be positioned between the λ/2 retardation film 30 and the λ/4 retardation film 50.

Another embodiment of the present invention provides an optical display apparatus that may include the polarizing plate 150. The optical display apparatus may include an organic light emitting diode (OLED) display apparatus, without being limited thereto.

FIG. 3 is a cross-sectional view of an optical display apparatus in accordance with one embodiment of the invention. Referring to FIG. 3, the optical display apparatus may include a panel 200; and a polarizing plate 110 formed on an upper side of the panel 200, the polarizing plate 110 may be the polarizing plate 100 or 150 according to the embodiments discussed above with regards to FIGS. 1 and 2, respectively.

Additional aspects and embodiments of the present invention will be explained in further detail below with reference to some examples. It should be understood that these examples are provided for illustration only and are not to be construed as limiting the present invention in any way.

Details of components used in the following examples and comparative examples were as follows:

(1) Polarizer: a polyvinyl alcohol film (PS#60, Kuraray Company, Japan, having a thickness before stretching of 60 μm);

(2) Protective film: HC TAC (TOPPAN Company, Model 40CHCA2);

(3) λ/2 retardation film: Ro (Re) at a wavelength of 550 nm ranging from 250 nm-280 nm, Rth ranging from 220 nm-240 nm, Nz ranging from 1.52-1.54, cycloolefin film with a thickness ranging from 40 μm to 50 μm (ZEON Company, Japan);

(4) λ/4 retardation film: Ro (Re) at a wavelength of 550 nm ranging from 130 nm-150 nm, Rth ranging from −100 nm to approximately −130 nm, Nz ranging from 1.48-1.50, acrylic film having a thickness ranging from 45 μm to 55 μm (OKURA Company, Japan);

(5) Adhesive: (Meth)acrylic adhesive; and (6) Bonding agent: Z-320 (Daiichi Kigenso Kagaku Kogyo, Japan).

EXAMPLES

A polyvinyl alcohol film was stretched to a length of approximately 2-3 times its initial length in a stretching bath at a temperature of 55° C., and iodine was adsorbed thereto. After this task, the resulting solution contained approximately 1.5 wt % to 2.5 wt % iodine and 3.0 wt % to 3.5 wt % boric acid. The resulting solution was stretched at a stretching rate of 15 mpm to 17 mpm. Through these processes, the polarizers were adjusted to have boric acid amounts as listed in TABLE 1, below. In addition, during drying of the polarizers, drying temperature, residence pass, and air volume upon drying were adjusted such that the polarizers had moisture amounts as listed in TABLE 1, below.

Next, a protective film and a λ/2 retardation film were stacked on upper and lower sides of the polarizer via adhesives. A λ/4 retardation film was then stacked on the λ/2 retardation film via a (meth)acrylic adhesive, thereby preparing a polarizing plate.

Comparative Examples

The amount of boric acid in the solution was adjusted to less than 3.0 wt % such that the polarizer contained the boric acid content listed in TABLE 1 (below). In addition, during drying of the polarizer, the drying temperature, residence pass, and air volume upon drying were each adjusted differently from those of the EXAMPLES such that the polarizers of the COMPARATIVE EXAMPLES had moisture amounts before lamination as reflected in TABLE 1. The polarizing plates were then prepared in the same manner as described with respect to the EXAMPLES.

BORIC ACID CONTENT IN POLARIZER BEFORE LAMINATION: A prepared polarizer was dissolved in water. A magnetic bar was placed in a 100 milliliter (ml) beaker, and 0.1 grams (g) of the prepared polarizer dissolved in water and 50 g of distilled water were added to the beaker and stirred at a temperature approximating 70~80° C. for one hour to completely dissolve the polarizer. The boric acid content in the prepared solution was measured using an automatic potential difference tester AT-500N. The boric acid content in the polarizer can be measured based on the amount of $AgNO_3$ used for titration of the boric acid in the tester.

MOISTURE CONTENT IN POLARIZER BEFORE LAMINATION: A polarizer prepared through stretching, drying, etc., was cut into a sample (length×width×thickness, 10 cm×10 cm×22 μm) before lamination, and the sample was sealed in an aluminum pack. A weight W1 of the polarizer before drying and a weight W2 of the polarizer after drying in an oven at a temperature of 105° C. for two hours were measured, and the moisture content in the polarizer was calculated according to the following Equation: $(W1-W2)/W1 \times 100$.

BORIC ACID CONTENT IN POLARIZER AFTER LAMINATION AND CURING: A prepared polarizing plate was dissolved in methylene chloride for 24 hours to separate the polarizer therefrom. The boric acid content was then measured in the same manner as described above. There was no significant difference in the boric acid content measured prior to lamination of the polarizer and after lamination thereof.

MOISTURE CONTENT IN POLARIZER AFTER LAMINATION AND CURING: A prepared polarizing plate was subjected to curing at a temperature of 25° C. for 24 hours. The prepared polarizing plate was then cut into a sample (length×width×thickness, 10 cm×10 cm×22 μm), and the sample was sealed in an aluminum pack. After curing, a weight W3 of the polarizing plate before drying, and a weight W4 of the polarizing plate after drying in an oven at a temperature of 105° C. for two hours were measured. The moisture content in the polarizing plate was then calculated according to the following Equation: $(W3-W4)/W3 \times 100$.

Properties of each of the polarizing plates prepared in the EXAMPLES and COMPARATIVE EXAMPLES were evaluated as is or in a state of being assembled to an OLED panel. The results of these evaluations are shown in TABLE 1, below.

(1) Transmittance (Ts) and the Degree of Polarization (P.E) were measured with respect to the prepared polarizing plates using a V-7100 device (manufactured by JASCO of Japan).

(2) The orthogonal b-coordinate value was measured with respect to the prepared polarizing plates using the V-7170 device (manufactured by JASCO of Japan). The V-7170 device includes a reference polarizing plate having a degree of polarization of 99.9%, and is designed to allow an absorption axis of a polarizer of a sample polarizing plate to cross an absorption axis of the reference polarizing plate at an angle of 90° when the sample polarizing plate is inserted into the device.

(3) Reflective brightness and color shift ($\Delta a^* b^*$) were measured at a lateral angle of 65° using an EZ-contrast 3D device (manufacture by Eldim of France).

TABLE 1

| | EXAMPLE NUMBER | | | | | |
|---|---|---|---|---|---|---|
| | 1 | 2 | COMPARATIVE 1 | COMPARATIVE 2 | COMPARATIVE 3 | COMPARATIVE 4 |
| Boric acid content in polarizer (wt %) | 21.6 | 21.9 | 20.0 | 20.0 | 20.0 | 20.0 |
| Moisture content in polarizer before lamination (wt %) | 25.0 | 25.5 | 26.0 | 26.5 | 27.0 | 28.0 |
| Moisture content in polarizing plate after lamination and curing at 25° C. for 24 hours (wt %) | 2.7 | 2.8 | 2.9 | 2.9 | 3.0 | 3.1 |
| Transmittance TS (%) | 45 | 45 | 45 | 45 | 45 | 45 |
| Degree of polarization P.E. (%) | 99.991 | 99.990 | 99.981 | 99.982 | 99.980 | 99.980 |
| Orthogonal b-coordinate value | −1.9 | −2.6 | −3.2 | −3.8 | −4.3 | −5.2 |
| Absolute orthogonal b-coordinate value | 1.9 | 2.6 | 3.2 | 3.8 | 4.3 | 5.2 |
| Reflective brightness (%) | 17.5 | 17.8 | 18.0 | 18.3 | 18.7 | 19.2 |
| Color shift (Δa*b*) | 8.8 | 8.9 | 9.4 | 9.7 | 9.8 | 10.3 |

As shown in TABLE 1, the polarizing plates according to embodiments of the present invention had low reflective brightness and color shift where the absolute b-coordinate value was 3 or less, resulting in anti-reflectiveness of external light while securing lateral visibility.

On the contrary, in the polarizing plates according to COMPARATIVE EXAMPLES 1 through 4, where the moisture content and the boric acid content in the polarizer were not in the ranges according to the embodiments of the present invention, the absolute b-coordinate value was greater than 3, and thus the resulting polarizing plates had high reflective brightness and color shift, thereby failing to reach the desired effects according to in the embodiments of the present invention.

Although some embodiments have been disclosed herein, it should be understood by those skilled in the art that these embodiments are provided by way of illustration only, and that various modifications, changes, and alterations can be made without departing from the spirit and scope of the present invention.

What is claimed is:

1. A polarizing plate, comprising:
a polarizer, a half-wavelength (λ/2) retardation film, and a quarter-wavelength (λ/4) retardation film,
wherein an absolute orthogonal b-coordinate value based on a CIELAB color coordinate system is approximately 3 or less when the polarizing plate is stacked with a reference polarizing plate having a degree of polarization of at least 99.9% such that an angle between an absorption axis of the polarizer and a reference absorption axis of a reference polarizer of the reference polarizing plate is 90°,
wherein at a wavelength of 550 nanometers, the quarter-wavelength (λ/4) retardation film has an out-of-plane retardation value ranging from approximately −100 nanometers to approximately −130 nanometers, and
wherein the out-of-plane retardation value (Rth) is calculated using the formula Rth=((nx+ny)/2−nz)×d, wherein nx, ny, and nz are refractive indexes in x-, y-, and z-axis directions of each retardation film, and d is a thickness of the retardation film.

2. The polarizing plate according to claim 1, wherein the polarizing plate comprises the polarizer, a protective film formed on an upper side of the polarizer, the λ/2 retardation film formed on a lower side of the polarizer, and the λ/4 retardation film formed on a lower side of the λ/2 retardation film.

3. The polarizing plate according to claim 1, wherein the absolute orthogonal b-coordinate value ranges from approximately 1.9 to approximately 2.6.

4. The polarizing plate according to claim 1, wherein the polarizing plate has a moisture content ranging from approximately 2.0 wt % to approximately 3 wt %, and the polarizer has a boric acid content ranging from approximately 20.5 wt % to approximately 22.5 wt %.

5. The polarizing plate according to claim 4, wherein the polarizer has a thickness ranging from approximately 5 micrometers to approximately 25 micrometers.

6. The polarizing plate according to claim 2, wherein the protective film comprises a resin comprising cellulose, polyester, cyclic polyolefin, polycarbonate, polyether sulfone, polysulfone, polyamide, polyimide, polyolefin, polyarylate, polyvinyl alcohol, polyvinyl chloride, and/or polyvinylidene chloride.

7. The polarizing plate according to claim 1, wherein at a wavelength of 550 nanometers, the half-wavelength (λ/2) retardation film has an in-plane retardation value ranging from approximately 200 nanometers to approximately 300 nanometers, and the quarter-wavelength (λ/4) retardation film has an in-plane retardation value ranging from approximately 100 nanometers to approximately 200 nanometers.

8. The polarizing plate according to claim 1, wherein at a wavelength of 550 nanometers, the half-wavelength (λ/2) retardation film has an out-of-plane retardation value ranging from approximately 220 nanometers to approximately 240 nanometers.

9. The polarizing plate according to claim 1, wherein the half-wavelength (λ/2) retardation film comprises a cycloolefin film, and the quarter-wavelength (λ/4) retardation film comprises an acrylic film.

10. The polarizing plate according to claim 1, wherein the half-wavelength (λ/2) retardation film and the quarter-wavelength (λ/4) retardation film comprise birefringences of opposite signs.

11. The polarizing plate according to claim 1, further comprising a protective film between the polarizer and the half-wavelength (λ/2) retardation film, or between the half-wavelength (λ/2) retardation film and the quarter-wavelength (λ/4) retardation film.

12. A method for preparing a polarizing plate, comprising:
preparing a polarizer comprising approximately 25 wt % to approximately 26 wt % moisture and approximately 20.5 wt % to approximately 22.5 wt % boric acid; and
forming a protective film and/or a retardation film on at least one surface of the polarizer,
wherein preparing the polarizer comprises:
stretching a polyvinyl alcohol film in an aqueous boric acid solution comprising approximately 3.0 wt % to approximately 3.5 wt % boric acid, and
drying the stretched polyvinyl alcohol film at a drying temperature of approximately 50° C. to approximately 70° C., and at an air volume having an air supply rate of approximately 1400 RPM to approximately 1500 RPM, and an air exhaust rate of approximately 2000 RPM to approximately 3000 RPM.

13. The method according to claim 12, wherein forming the protective film and/or the retardation film comprises:
placing a protective film on an upper surface of the polarizer, and
placing a half-wavelength (λ/2) retardation film on a lower surface of the polarizer, and a quarter-wavelength (λ/4) retardation film on a lower surface of the half-wavelength (λ/2) retardation film.

14. An optical display apparatus comprising:
a panel; and
a polarizing plate stacked on an upper surface of the panel;
wherein the polarizing plate comprises a polarizer having an absorption axis, a half-wavelength (λ/2) retardation film on a lower surface of the polarizer, and a quarter-wavelength (λ/4) retardation film on a lower surface of the half-wavelength (λ/2) retardation film,
wherein an absolute orthogonal b-coordinate value based on a CIELAB color coordinate system is approximately 3 or less when the polarizing plate is stacked with a reference polarizing plate having a degree of polarization of at least 99.9% such that an angle between the absorption axis of the polarizer and a reference absorption axis of a reference polarizer of the reference polarizing plate is 90°,
wherein at a wavelength of 550 nanometers, the quarter-wavelength (λ/4) retardation film has an out-of-plane retardation value ranging from approximately −100 nanometers to approximately −130 nanometers, and
wherein the out-of-plane retardation value (Rth) is calculated using the formula Rth=((nx+ny)/2−nz)×d, wherein nx, ny, and nz are refractive indexes in x-, y-, and z-axis directions of each retardation film, and d is a thickness of the retardation film.

15. The optical display apparatus according to claim 14, wherein the polarizer further comprises a transmission axis, and the absolute orthogonal b-coordinate value based on the CIELAB color coordinate system is approximately 3 or less when the polarizing plate is stacked with the reference polarizing plate having a degree of polarization of at least 99.9% such that an angle between the transmission axis of the polarizer and a reference transmission axis of the reference polarizer of the reference polarizing plate is 90°.

16. The optical display apparatus according to claim 14, wherein the apparatus is an organic light emitting diode (OLED) display apparatus.

17. The optical display apparatus according to claim 14, wherein the polarizing plate further comprises:
a protective film on an upper surface of the polarizer; and
an adhesive layer on a lower surface of the half-wavelength (λ/2) retardation film.

18. The optical display apparatus according to claim 17, wherein the polarizing plate further comprises a second adhesive layer on a lower surface of the a quarter-wavelength (λ/4) retardation film.

19. The optical display apparatus according to claim 14, wherein:
the polarizing plate has a moisture content ranging from approximately 2.0 wt % to approximately 2.8 wt %;
the polarizer has a boric acid content ranging from approximately 20.5 wt % to approximately 22.5 wt %; and
the half-wavelength (λ/2) retardation film has an in-plane retardation value ranging from approximately 200 nanometers to approximately 300 nanometers, and the quarter-wavelength (λ/4) retardation film has an in-plane retardation value ranging from approximately 100 nanometers to approximately 200 nanometers at a wavelength of 550 nanometers; and
the half-wavelength (λ/2) retardation film has an out-of-plane retardation value ranging from approximately 220 nanometers to approximately 240 nanometers at a wavelength of 550 nanometers.

* * * * *